United States Patent Office 3,423,665
Patented Jan. 21, 1969

3,423,665
ELECTRONIC POWER SUPPLIES WITH INVERTERS AND REGULATORS
Sol Greenberg, Roslyn, and George A. Gautherin, Woodside, N.Y., assignors to Lambda Electronics Corporation, Huntington, N.Y., a corporation of New York
Filed Oct. 23, 1965, Ser. No. 503,119
U.S. Cl. 321—11                      34 Claims
Int. Cl. H02m 1/18

ABSTRACT OF THE DISCLOSURE

Electronic power supplies are disclosed with improved inverter and regulator circuits. The inverter circuit includes controlled switches such as controlled rectifiers, a saturable inductor to improve switch-over operation and fail-safe interlock circuits to prevent the simultaneous conduction of the controlled switches. The inverter circuit is also provided with a feature which automatically limits the voltages in the inverter circuit irrespective of changes in load. The regulator is provided with circuits which are selectively energized to controllably divert current from the load in response to changes in load requirements.

---

This invention relates to power supplies and more particularly to electronic power supplies.

By way of example, the accompanying description refers to a particular form of supply although it will be clear that the discussion and techniques have a broad range of application.

There is a continuously increasing demand for greater power outputs from power supplies with the requirement that these increased outputs be provided with minimum size and weight and with optimum performance criteria. Normally, however, high power requires a correspondingly large weight and volume and it is one object of the invention to improve this relationship.

A further object of the invention is to provide a high power capacity supply of relatively small weight and size which draws upon the advantages of inverter circuits while eliminating a number of their principal disadvantages.

A still further object of the invention is to combine inverter and rectifier circuits in a combination which, although being of relatively small size and weight, provides adjustable high level regulated output power.

Among the other objects of the invention are improvements in power supply efficiency, operational stability (AC and DC), and load range, and these and other objects and advantages of the invention will be set forth in part hereinafter, or in part will be obvious herefrom, or may be learned by practice with the invention, the same being realized and attained by means of the instrumentalities and techniques pointed out in the appended claims and described below.

In the exemplary embodiment according to the invention, a series inverter of the center-tapped source type is employed in combination with a power control system and rectifier to produce a regulated output at power levels from zero up to one or more kilowatts, e.g. 5 volts at 200 amperes. The inverter has the capability of high frequency operation and in the illustrated example operates in the region of 10 kc. This arrangement provides a significant improvement in the ratios of power to weight and power to size enabling packaging in standard rack mountings. The design also permits the elimination of the input power line transformer found in conventional series and shunt DC regulators and this factor contributes to these improvements. They also follow from the relatively high operating frequency of the supply. Also, a significant improvement in efficiency is realized, this feature being enhanced by circuit configurations which materially reduce the RMS/DC ratio.

The relatively high operating frequency also facilitates ripple reduction. RFI and spike suppression, and rapid response time, are additional features of the invention.

In the preferred embodiment of the invention, the switching devices utilized in the inverter circuit comprise controlled rectifiers, e.g., silicon controlled rectifiers (reference to such devices is intended to include devices with analogous properties). While these devices offer important advantages in terms of power handling capability and switching time, they are burdened by a commutation problem. This problem follows from the fact that once the controlled rectifier is energized by application of an appropriate gate signal, it remains energized until a reverse current is forced through the anode-cathode circuit of sufficient magnitude and duration to turn the controlled rectifier off. The fact that the controlled rectifier remains conducting once it is turned on, renders the inverter circuit susceptible to a condition wherein both controlled rectifiers are conducting at the same time. Such a condition, besides causing an output failure, is also capable of causing a substantial amount of damage internally and externally. It is accordingly an additional object of the invention to eliminate any possibility of this condition of simultaneous conduction from occurring in the inverter circuit no matter what operating conditions prevail.

The control system according to the invention also enables the supply to provide greater power output for the same component ratings while at the same time providing effective and reliable commutation of the controlled rectifiers. A low RMS/DC ratio and high efficiency result.

An additional limitation characterizing many inverter circuits is the tendency under certain load conditions for unused power to build up in the system to the point where excessive circulating power causes either thermal or voltage breakdown. In the control circuits according to the invention, this problem is eliminated and the system will operate stably over a wide range of load values from zero to the maximum rated load.

The invention consists in the novel parts, combinations, arrangements, improvements and techniques herein shown and described.

Serving to illustrate an exemplary embodiment of the invention are the drawings of which:

Figure 1:
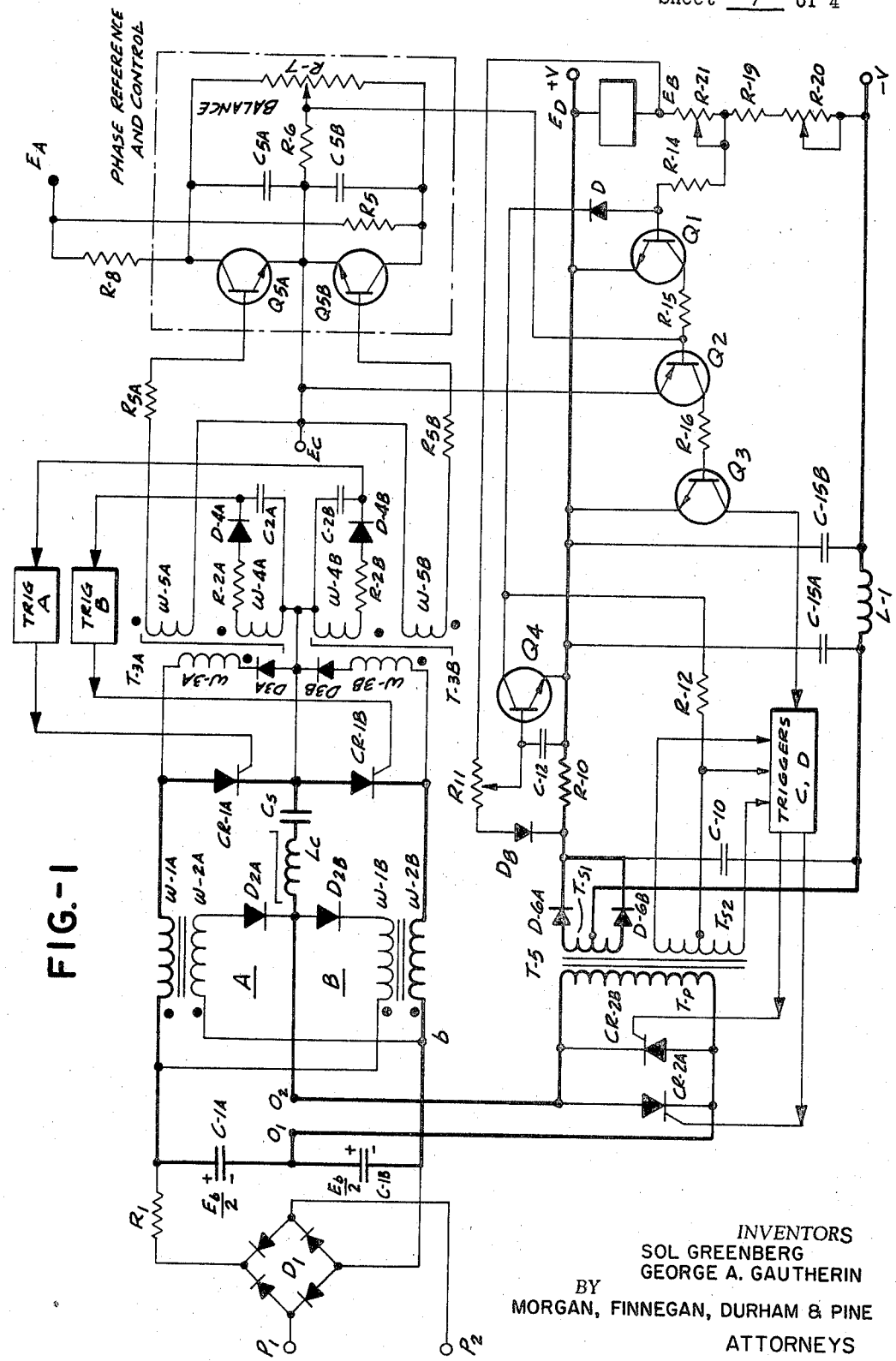
FIGURE 1 is a schematic diagram illustrating the overall power supply system including certain novel stages thereof.

In the exemplary embodiment shown in FIGURE 1, and for purposes of explanation, the power-flow circuits are illustrated in heavy lines.

Input AC power is applied to terminals $p_1$ and $p_2$ shown to the left of FIGURE 1; this power is rectified by bridge D1 and applied via resistance R1 to a pair of capacitors C–1A and C–1B. These capacitors, together with the components shown in the heavy line to the right thereof, constitute a series inverter circuit of the center-tapped source type. This circuit is energized by the voltages appearing across C–1A and C–1B. For illustration, these voltages are each designated $E_b/2$.

The inverter comprises two identical channels; one channel, designated A, is formed by a series combination of choke winding W–1A, controlled rectifier CR–1A, capacitance $C_s$, and saturable inductance $L_c$. The capacitor and saturable inductor are common to both channels. The other channel comprises the series combination with $C_s$ and $L_c$ of controlled rectifier CR–1B and choke winding W–2B. The common leg not only includes $C_s$ and $L_c$, but also includes the inverter output terminals $O_1$ and $O_2$ in series therewith. From these terminals, the generated AC power is supplied to a power transfer control system controlled by a regulator and from thence to a rectifier and filter which supplies regulated DC at the output terminals $+V$ and $-V$. This flow is indicated by the heavy lines running from the inverter output terminals.

In general, the inverter functions in the following manner: when CR–1A is energized, power flows from the source represented by the voltage across C–1A, through winding W–1A and the controlled rectifier, thereby charging up $C_s$ to a value which approaches twice the voltage across C–1A. Consequently, a sinusoidal pulse of current flows through the inverter output terminals $O_1$ and $O_2$. As capacitor $C_s$ reaches its peak charge, the current in channel A reverses direction due to the resonant character of the circuit whereupon reverse current is forced through CR–1A causing it to cut off.

A similar commutation technique is disclosed in applicants' copending application Serial No. 360,229, filed Apr. 16, 1964, entitled Regulated Power Supplies With Self-Commutating Switching, now Patent No. 3,331,014 and assigned to the assignee of the instant application.

As CR–1A is cut off, the reverse current is diverted through a circuit paralleling CR–1A; this circuit includes diode D–3A and winding W–3A of transformer T–3A. This diverted reverse current produces a trigger action as hereinafter described which causes a trigger signal to be generated and applied via the B trigger cricuit to controlled rectifier CR–1B in the B channel of the inverter. Consequently, after the A channel is cut off, the B channel is activated. When CR–1B is neregized, a sinusoidal pulse of current flows through the output terminals in the direction opposite to that produced by channel A. This pulse also flows through $C_s$, $L_c$, the controlled rectifier CR–1B and choke winding W–2B. When $C_s$ reaches its peak charge in the opposite direction from that attained during the operation of channel A, reverse current flows in channel B cutting off CR–1B. As soon as the latter is cut off, the reverse current flow is diverted through the input of another trigger circuit which includes winding W–3B of transformer T–3B and diode D–3B. This action actuates the A trigger circuit causing a trigger to be applied to the gate of CR–1A. As a result, the A channel is again fired.

It may be seen that the channels operate alternately, producing an alternating current flow at the inverter output terminals $O_1$ and $O_2$. This current is passed through the primary winding T–P of a transformer T–5 with appropriate amounts of the current being diverted as power supply regulation requires. This control is effected by the action of shunt controlled rectifiers CR–2A and CR–2B which are controlled in turn by the error detecting circuit. These rectifiers are oppositely polarized and connected in parallel across primary winding T–P. Hence, a controlled amount of current is delivered to the secondary side of transformer T–5 where it is rectified and supplied to the output terminals.

To reduce certain undesirable effects associated with the lag between the switching times of CR–1A and CR–1B, the common branch of the inverter includes the small saturable inductance $L_c$ which functions to improve circuit operation during the switchover period as described more fully below.

Interlock system

It may be noted that the inverter controlled rectifiers (CR–1A, CR–1B) are interlocked in such a manner as to eliminate the possibility of simultaneous conduction of both rectifiers. The controlled rectifier CR–1B in channel B can only be energized provided reverse current has been forced through rectifier CR–1A in the A channel and a reverse voltage maintained across it for a sufficiently long period of time to insure its turn off. Unless these conditions prevail, the triggering action will not occur and consequently CR–1B will not be energized. Hence, there is a positive acting fail-safe interlock between the two controlled rectifiers preventing both of them from being in the conductive condition simultaneously.

The controlled rectifier interlock system also leads to another advantage. In some inverter circuits it is customary to control the controlled rectifiers from an external fixed frequency trigger source which is operated independently of load conditions. In order to insure that both rectifiers are not energized at the same time, and in order to prevent build up of unused power, the triggering period must be set at a value which is materially longer than the resonant period of each channel of the inverter. This is to insure that in one case the unused stored power is fully removed and in the other, that the energized controlled rectifier is fully off before the alternate rectifier is turned on. As a result of this frequency relationship, there is a certain rest or dead time in the operation of the system. This dead time leads to a relatively poor RMS/DC current ratio with a consequent reduction in efficiency. (Moreover, overload and other conditions can cause both controlled rectifiers to be energized concurrently.) In contrast, with the CR interlock systems of the invention, the current flow in the common leg of the inverter and output circuit is continuous whereby a 100% duty cycle is achieved. As a result, the RMS/DC ratio of the output circuit approaches the ideal value of 1.1/1. This action is complemented by the shunt arrangement of the rectifier regulators CR–2A and CR–2B which also isolate the effect of T5 on the inverter circuit during no-load conditions. The shunt arrangement of CR–2A and CR–2B also facilitates no-load operation.

In addition to the foregoing, the use of the interlock system permits a wider range of load values. The load resistance can more closely approach that value which corresponds to the critical damping resistance of the inverter circuit without endangering the commutating action.

Inverter automatic amplitude control

Considering circuit operation from the moment of turn-on, an analysis of the inverter circuit of FIGURE 1 thus far described indicates that $C_s$ charges up during initial operation of channel A to approximately $E_b$ under no-load conditions (i.e. with an effective short between terminals $O_1$ and $O_2$). At that time, the voltage drop across choke winding W–1A approximates $E_b/2$. Hence when CR–1B is turned on, the voltage across W–2B in channel B is approximately 1.5 $E_b$. With normal choke action, this voltage at the end of the conduction period in channel B would approach 1.5 $E_b$ again, of the opposite polarity. Under this condition and to satisfy the voltage conditions required in channel B, the voltage across $C_s$ would now be equal to $2E_b$. In other words, the capacitor has not only discharged from its initial value of $E_b$ of one polarity, but has charged up in the opposite direction to twice its original peak value. An analysis of the circuit will show that this action builds up from cycle to cycle and is a reflection of the fact that the inverter circuit is storing power each cycle. It behaves like an underdamped oscillator the amplitude of which builds up over each cycle because of the lack of loading. Ultimately, a breakdown would result.

This runaway action is eliminated by control circuits associated with the two channels of the inverter. A winding W-2A is coupled to winding W-1A and similarly, a winding W-1B is coupled to winding W-2B. Illustratively, these windings are in a one-to-one ratio and are polarized as indicated. One side of each of these additional windings is connected via a respective diode D2A and D2B to the common branch of the two channels. The other side of winding W-1B is connected to the junction of C-1A and W-1A; in analogous manner, the other terminal of winding W-2A is connected to the junction of C-1B and W-2B. The function of each of these circuits is to automatically limit the swing of the respective primary winding, W-1A and W-1B for all operating load values such that the peak charge on $C_s$ does not vary in an adverse way from cycle to cycle and specifically does not continuously build up. Thus, as the voltage across winding W-2B reverses polarity and starts to rise in the opposite direction, a corresponding action occurs in secondary winding W-1B. However, as soon as this secondary voltage equals a value equal to the sum of the voltages across source capacitor C-1A and the voltage across output terminals $O_1$ and $O_2$, it is limited and does not increase further. The same limiting action occurs with respect to the drop across W-1A. Hence, the charge on $C_s$ is prevented from building up from cycle to cycle. Analysis will show that this action involves the transfer of energy from the windings W-1A and W-2B back to the source capacitors C-1A and C-1B in the alternate channel. As a result of this action, there is no adverse continuous build up of stored circuit power in the inverter circuit when it would otherwise be developing power in excess of that required by the load. It may be seen that the difference between the power available and the power required by the load is returned to the source.

The automatic inverter amplitude control action also eliminates the need for a rest time allocated to the discharge of $C_s$ back to its desired level. As a consequence, this control feature also contributes to the continuous flow of current in the inverter with the consequent establishment of an optimum RMS/DC ratio.

It may be seen that the limiting circuit acts to maintain the flow of current through the load terminals $O_1$ and $O_2$ during the limiting action. However, the action of the limiting circuit interferes to some extent with effective operation of the triggering circuit. It is desirable to effect triggering during the limiting action so that there is no substantial discontinuity or dead time in current flow through the load terminals. The saturable inductor $L_c$ facilitates this operation. As forward current in the resonant circuit decays, due to the limiting action, the saturable inductance $L_c$ comes out of the saturated state and supplies an additional source of energy which permits effective triggering during the limiting action. The saturable inductor supplies a controlled additional charge to $C_s$ and this charge acts as a source of turn-off energy for the respective trigger circuit, notwithstanding the presence of limiting action. Hence, dead time in the load current wave form is avoided.

*A and B trigger circuits of controlled rectifier interlock system*

As noted previously, the cut-off current flowing in CR-1A at the end of the conduction period in channel A is diverted through the input of the trigger circuit as CR-1A is being cut off. This current flows in winding W-3A thereby inducing a voltage in a secondary winding W-4A. The transformer T-3A which includes these windings is of the saturable type and the voltage appearing across W-3A is of a polarity which insures a continued reverse bias across CR-1A. In this connection it should be noted that the inductance of W-3A is larger than that of W-1A; hence the natural period of the resonant circuit which includes this branch is materially longer than the main power circuit before saturation and the duration of the reverse bias voltage applied to CR-1A is thus increased.

The voltage induced in winding W-4A is applied to the series combination of resistance R2A, diode D-4A and capacitor C-2A. As a result, the voltage across C-2A commences to rise. The effect of this voltage is to actuate the B trigger circuit thereby causing CR-1B to fire.

Figure 3:
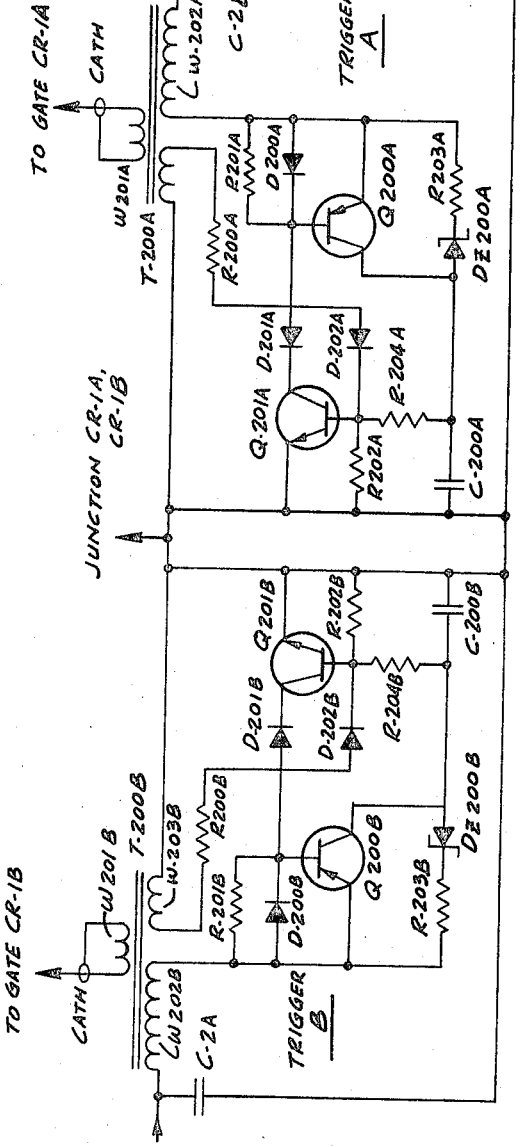
FIGURE 3 is a schematic diagram of two trigger circuits, designated trigger A and trigger B, utilized in the control of the inverter switches in FIGURE 1.

As shown in FIGURE 3, the voltage across C-2A is applied to the B trigger circuit which includes windings W202B, W203B and W201B of trigger transformer T200B. Winding W201B supplies a trigger signal between the gate and cathode of CR-1B. This causes the B channel controlled rectifier to fire following the cut-off of the A channel rectifier.

Connected across capacitor C-2A is a circuit comprising the series combination of winding W202B, resistance R203B, Zener diode DZ200B, resistor R204B and the base-emitter of stage Q201B. Also connected across the base-emitter of stage Q201B is the series combination starting at the base, of diode D202B, resistance R200B and winding W203B. Connected in parallel with R204B is the series combination of R202B and C200B, the junction of which is connected to the lower side of C-2A. Connected across the combination of R203B and DZ200B is the emitter-collector circuit of pnp stage Q200B. The base of this stage is connected via the parallel combination of R201B and diode D200B to the junction of W202B and the emitter. The base of Q200B is also connected via D201B to the collector of Q201B.

Initially, the rising voltage appearing across C-2A causes a small charging current to flow in the triggering circuit from the upper side of C-2A through W202B, R203B, the Zener diode, R204B and the base-emitter circuit of the npn transistor Q201B. From the emitter, this current returns to the other side of C-2A.

It may be seen that, after a delay produced by C200B which functions to provide sufficient cut-off time for CR-1A and to insure sufficient charge on C-2A to effect proper triggering, the base-emitter current commences to flow in stage Q201B causing that stage to conduct. Thereupon, another conductive path for current flow from C-2A is provided. This path comprises winding W202B, the emitter and base of pnp stage Q200B, diode D201B, the collector-emitter circuit of Q201B, back to the other side of C-2A. This current flow is amplified over the first-described current by virtue of the amplifying action of Q201B.

As a result of base-emitter current in Q200B, this stage conducts thereby connecting a third path to capacitor C-2A. This path comprises W202B, the emitter and collector of Q200B, R204B, the base-emitter of Q201B, back to the other side of C-2A. It should also be noted that a voltage is induced in winding W203B which has the effect of adding additional current to the base emitter circuit of Q201B via R200B and diode D202B. It may be seen that the entire circuit is regenerative and fast-acting. It is designed to take advantage of the high frequency capability of the controller recifiers;[1] the trigger it provides thus insures the rapid turn-on of controlled rectifier CR-1B.

An identical circuit will be found associated with the A trigger system and it functions in the same manner. The A trigger arrangement is supplied from capacitor C-2B which, referring back to FIGURE 1, is seen to be charged when CR-1B cuts off, causing current to flow in winding W-3B. These trigger circuits are capable of producing a rate of change of gate current in excess of 10 amps. per microsecond, thus insuring that the control rectifiers are switched on as fast as their characteristics permit.

*Turn-on system*

Figure 5:
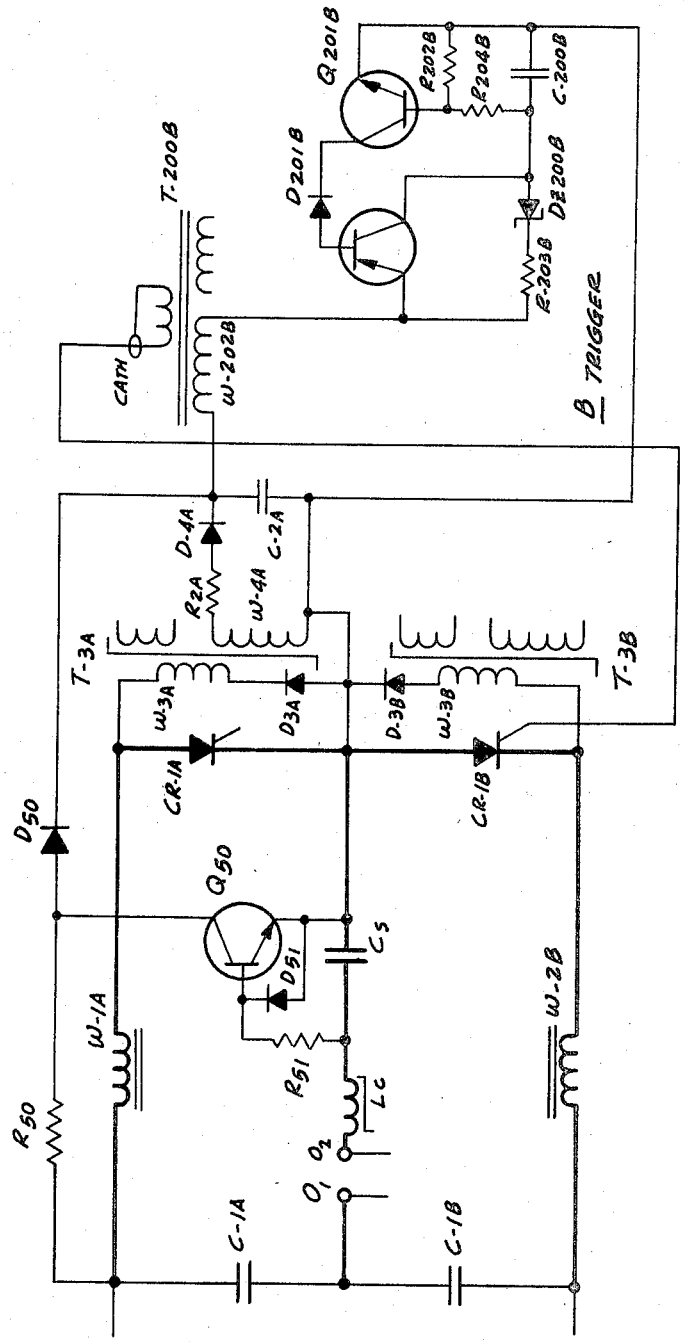
FIGURE 5 is a schematic circuit diagram of certain additional components of the system.

During system turn-on, and with both controlled rectifiers CR-1A and CR-1B deenergized, there is no energiz- ---
[1] Rectifier type C141D (2N3658), e.g.

ing path to supply a trigger signal to either of the controlled rectifiers. This is because of the polarization of diodes D–3A and D–3B (FIG. 1) in the A and B trigger circuits. In addition, in a typical case there may not be a sufficient rate of change of current through W–3A or W–3B to effect triggering. This may result from the relatively slow rate of rise of source potential. An exemplary solution to this problem is shown in FIGURE 5 which includes a sufficient number of elements of the circuit of FIGURE 1 to explain the operation of the turn-on system.

As embodied, the turn-on system includes an auxiliary path between the source and integrating capacitor C–2A. This path comprises resistance R50 and diode D50. The function of this path is to supply a source of charging current to the capacitor so that its voltage may rise to a value sufficiently high to actuate the B trigger circuit which is accordingly designed to fire first. This insures the initial turn-on of controlled rectifier CR–1B. In order to insure that the charge across C–2A is not dissipated prematurely, the B trigger circuit includes the Zener diode DZ200B previously described. Diode D50 blocks the discharge of capacitor C–2A through circuits external to the trigger circuit.

*Overload system*

As previously noted, turn-on involves the triggering of CR–1B. During such turn-on, the voltage across $C_s$ typically approaches some value, for example, 80 volts, and is of a polarity whereby the side connected to output terminal $O_2$ is positive. Following the actuation of CR–1B and during the conduction period thereof, this voltage across $C_s$ rises to some new value, $E_2$. This value may not be sufficiently different from the source voltage $E_b/2$ to actuate the A trigger circuit for firing CR–1A. This is especially the case during overload conditions. As a result, the system following an overload will not oscillate as required. The turn-on action as previously described would then recommence, causing the voltage on $C_s$ to decay. However, it may not decay sufficiently rapidly to eliminate the aborted firing just described.

To overcome this problem, the overload restart circuit is provided. This circuit includes an npn transistor stage Q50 having its emitter connected to the right side of $C_s$ and its base connected via R51 to the left side of $C_s$. Hence, the emitter-base circuit, together with R51, is connected across the switching capacitor. It may be seen that with the $O_2$ side of $C_s$ positive as just described, the emitter-base circuit of Q50 is energized. Hence $C_s$ is discharged. In addition, collector-emitter current flows and since the collector is connected to the junction of R50 and D50, a shunt path is provided for preventing the charging of C–2A until $C_s$ is fully discharged. Circuit parameters are selected so that this discharge will be sufficient to cause normal turn-on conditions to prevail. That is, at the end of the conduction period of CR–1B, a sufficient reverse voltage thereacross will occur to trigger the A trigger circuit, thus causing CR–1A to follow the firing of CR–1B.

Diode D51 is to prevent the application of excessive reverse current to the emitter-base circuit of Q50.

*Output regulating circuits*

As noted previously, two controlled rectifiers, CR–2A and CR–2B are connected across the inverter output terminals $O_1$ and $O_2$. The firing times of these rectifiers determine the amount of inverter current which is diverted from the primary T–P of transformer T–5. In this way, the power transferred to the output circuit is controlled.

Control over rectifiers CR–2A and CR–2B involves a phase reference circuit shown in FIGURE 1. This reference circuit includes a balancing potentiometer R7. Connected across the potentiometer is the series combination of capacitors C5A and C5B; a resistance R6 is connected between the junction of these capacitors and the arm of the potentiometer.

Figure 2:
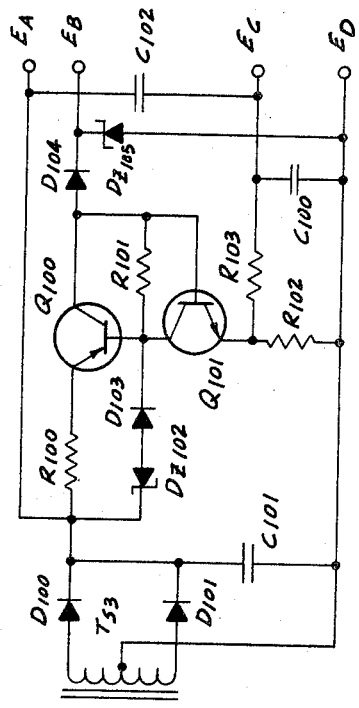
FIGURE 2 is a schematic diagram of the circuit which supplies control circuit operating potentials and a source of reference potential for the system of FIGURE 1.

Connected in parallel with C5A is the emitter-collector circuit of npn stage Q5A; similarly, the emitter-collector circuit of an npn stage Q5B is connected across C5B. Both collectors are connected through respective resistances R8 and R5 to a positive potential source designated $E_A$ which is obtained from the auxiliary supply (FIG. 2). Both emitters are connected to another reference potential source designated $E_c$ which is also obtained from the auxiliary supply.

Connected between the base and emitter of Q5A is a resistance R5A and winding W–5A of saturating transformer T–3A; similarly, a resistance R5B and winding W–5B of T–3B are connected between the base and emitter of Q5B. During the conduction period of inverter-rectifier CR–1A, a saw-tooth of voltage is developed across C5A in the phase reference circuit by virtue of charging current flowing out of terminal $E_a$ of the auxiliary supply through R8 and the capacitor to terminal $E_c$. During this period, Q5A is cut off. At the end of the conduction period in channel A of the inverter, a pulse of voltage is coupled into winding W–5A in the same manner as described in connection with the trigger voltage induced in companion winding W–4A. The voltage induced in W–5A causes transistor Q5A to be switched on thus causing capacitor C5A to discharge. The time constants and other circuit parameters are so selected that a generally saw-tooth shaped signal results. This sawtooth occupies a period equal approximately to one full alternating cycle of the inverter.

A similar action produces a saw-tooth across capacitor C5B of the same duration. The connection of R6 and R7 functions to add these two saw-tooth signals together and since they are phase displaced by 180° of the inverter cycle, a resultant saw-tooth is developed which occurs during each half-cycle of inverter operation. This resultant saw-tooth is coupled to the base of $Q_2$ in the regulating system. Also coupled to the base of $Q_2$ is the output of npn transistor stage $O_1$. This stage has its base-emitter circuit energized by the error voltage resulting from the departure of the output voltage from the selected reference potential. Thus, the base of $Q_1$ is connected through a resistor $R_{14}$ to the junction of R21 and R19. These components form part of the total divider network connected across the output terminals of the supply. As embodied, this divider comprises the series combination of potential $(E_B-E_D)$ of the reference supply, adjustable resistance R21, resistance R19, and adjustable resistance R20. Since the emitter of $Q_1$ is connected to the +V terminal, this stage is energized by the error signal as previously mentioned.

Appearing at the base of $Q_2$ is the sum of the amplified error signal and the previously described saw-tooth voltage. Hence, the level of the saw-tooth varies as a function of the error signal with the saw-tooth being balanced by appropriate adjustment of resistance R7.

The pnp stage $Q_2$ is normally biased to the on state. However, when the saw-tooth reaches a point determined by the amplitude of the error signal, stage $Q_2$ is turned off. This follows from the interruption of emitter-collector current in $Q_2$ which during the quiescent state flows from terminal $E_c$ through the emitter and collector of $Q_2$ and thence via R16 through the base and emitter of $Q_3$ back to the +V terminal which is also potential point $E_D$ of the auxiliary supply. The resultant cut-off of $Q_3$ causes energization of the appropriate trigger circuit C or D causing the associated controlled rectifier CR–2A or CR–2B to fire depending upon which half-cycle of operation exists in the inverter circuit. The details of the C and D trigger circuits are supplied in FIGURE 4.

Figure 4:
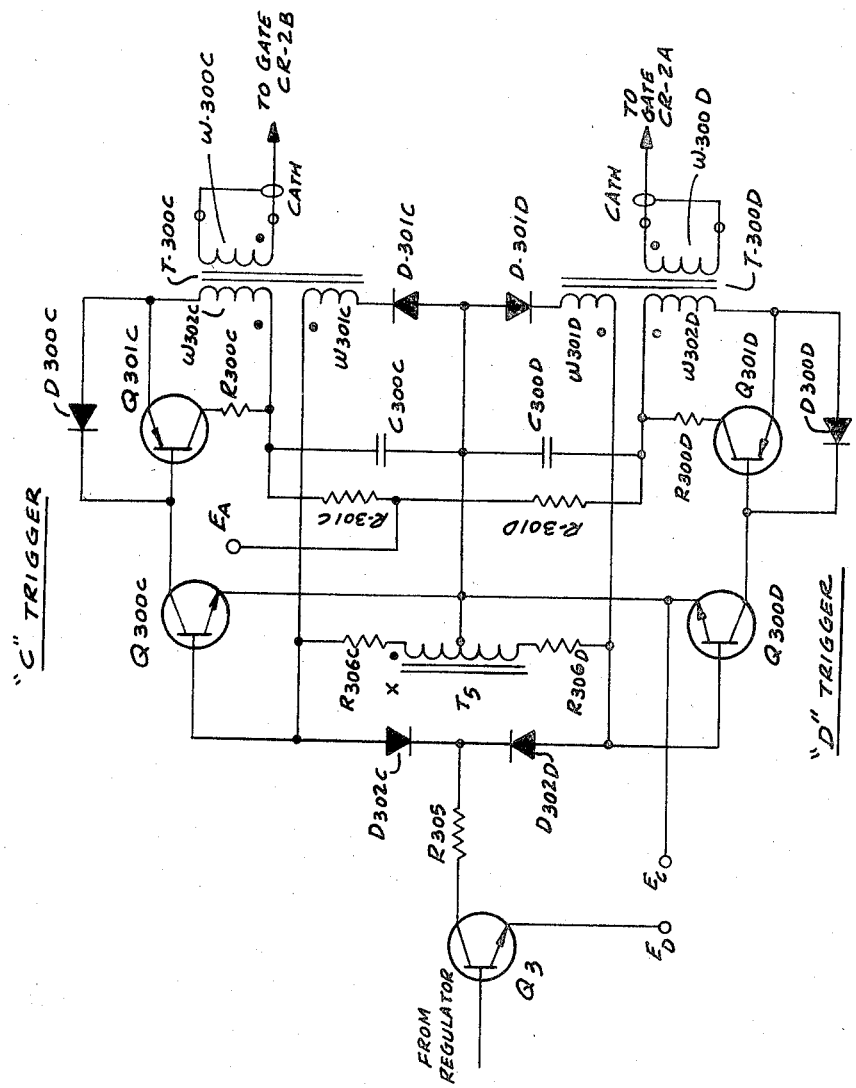
FIGURE 4 is a schematic diagram of two additional trigger circuits, C and D, utilized in switching two controlled switches employed in the power transfer section of the system of FIGURE 1.

As shown in FIGURE 4, the stage $Q_3$ is connected to the input of both trigger circuits. These circuits are also supplied with gating potentials from the secondary T–S2 of transformer T–5. This secondary winding is also shown in FIGURE 1. The C trigger circuit includes an npn transistor stage Q300C having its base connected via a resistance R306C to terminal X of the transformer secondary T–S2. The emitter is connected to the center-tap. The base of Q300C is also connected via a diode D302C and a resistance R305C to the collector of the regulator stage $Q_3$ previously described. A further connection to the base includes regenerative winding W301C of transformer T300C, the secondary winding of which is used to supply the trigger to the gate and cathode of controlled rectifier CR–2B as schematically indicated in FIGURE 1. The other side of winding W301C is connected via a diode D301C to the common bus connected to the center-tap of T–S2. This common bus is also connected to auxiliary reference potenital point $E_C$.

The C trigger circuit also includes a pnp transistor stage Q301C having its emitter base circuit shunted by a diode D300C and its base connected to the collector of Q300C. The emitter of Q301C is connected to one side of winding W302C of transformer T300C while its collector is connected to the other side of this winding via resistance R300C.

The junction of R300C and winding W302C is connected via a resistor R301C to auxiliary source potential point $E_A$. Also connected to the bus is one side of a capacitor C300C, the other side of which is connected to the junction of R300C and winding W302C.

The D trigger circuit is identical to the C trigger circuit and functions in the same manner as will be described below.

Secondary winding T–S2 serves as a source of gating potential; when terminal X is negative with respect to the center-tap, stage Q300C is cut off since its base-emitter circuit is energized from this winding. During this period, stage Q301C is also cut off. Concurrently, capacitor C300C is charged from terminal $E_A$ via resistor R301C, the other side of C300C being connected to auxiliary terminal $E_C$. The charge on C300C serves to supply the energy necessary to trigger the controlled rectifier when its energization is required.

During the half-cycle of inverter operation just described, the C trigger circuit is disabled because, as noted, the upper terminal X of T–S2 is negative relative to the center-tap. During the next half-cycle, the polarity of this potential reverses, causing current to flow out of terminal X. If the regulator clamp stage $Q_3$ is conducting, signalling no need for firing the C trigger channel, then the current flowing out of terminal X flows via R305 through the collector-emitter circuit of $Q_3$ and thence through terminals $E_D$ and $E_C$ of the auxiliary supply back to the center-tap. If, however, the error signal is of an amplitude causing $Q_3$ to be cut off and thereby signifying the need for the firing of CR–2B at that particular instant of time, then the current flowing out of terminal X flows instead through the base-emitter circuit of Q300C causing it to turn on. The switching on of Q300C causes in turn the switching on of Q301C. This action completes a discharge path for capacitor C300C as follows: from the top of C300C current flows through winding W302C, through the base-emitter of Q301C and thence through the collector and emitter of Q300C back to the lower terminal of C300C. Regenerative action is promoted by reason of the voltage thereby induced in winding W301C since this voltage supplies additional base-emitter current to Q300C. Maximum conduction is rapidly achieved through winding W302C causing a trigger to be induced into secondary winding W300C. As previously mentioned, this trigger switches on controlled rectifier CR–2B at the appropriate instant of time causing current to be diverted from the output circuit in conformity with load requirements. Capacitor C300C and the other circuit parameters are adjusted in connection with the leakage inductance of T300C to produce a resonant effect which causes a cut-off of the trigger circuit as soon as the trigger pulse has been delivered.

During the above interval of time, capacitor C300D has been charged in the D trigger circuit and the operation of that arrangement is similar to the action in the C trigger circuit. Hence, at an appropriate instant of time in the next half-cycle, CR–2A is fired, diverting excessive load current from the output circuit as a function of the error signal.

The auxiliary supply which provides reference potential as well as necessary supply voltages is illustrated in FIGURE 2. This circuit is supplied with an AC potential from winding T–S3 which may be coupled to one of the inverter chokes W–1A or W–2B. A full wave rectifier D100, D101, C102, convert this voltage into a direct voltage which appears at terminals $E_A$ and $E_D$ and which passes through the regulating circuit to supply voltages at $E_B$ and $E_C$.

From the junction of diodes D100 and D101, a connection is made via resistance R100 to the emitter-collector circuit of pnp stage Q100. The collector of Q100 is connected via a diode D104 to output terminal $E_B$. Zener diode DZ105 is connected between this terminal and center-tap terminal $E_D$. From the rectifier diode junction to the base of Q101 is connected the series combination of Zener diode DZ102 and diode DZ103 while a resistor R101 is connected from the base to the collector of Q100.

The base of Q100 is also connected to the collector of npn stage Q101 and the base of the latter is connected to the collector of Q100. The emitter of Q101 is connected to terminal $E_D$ via R102 and to terminal $E_C$ via R103. Connected between terminals $E_C$ and $E_D$ is a filter capacitor C100 and between $E_A$ and $E_C$, capacitor C102.

The auxiliary source comprises a known constant current source employing the transistors Q100 and Q101 in a complementary symmetry configuration whereby a regulated reference voltage $E_B$–$E_D$ appears across DZ105 with auxiliary potentials appearing at the other output terminals.

It should be understood that in studying and practising the invention modifications will undoubtedly occur to those skilled in the art. The invention is thus not to be limited to the specific circuits and components herein shown and described but departures may be made therefrom within the scope of the accompanying claims.

What is claimed is:

1. A power supply comprising a load circuit, first and second controlled rectifier means connected to alternately deliver current to said load circuit, a source of direct current for supplying current to said rectifier means, commutation means for driving cut-off current through said rectifier means, first and second trigger circuits coupled respectively to said first and second controlled rectifier means to receive a signal when said respective rectifier means is cut off for triggering on the other rectifier means, said trigger circuits including regenerative circuit means.

2. An inverter comprising first and second resonant loops each having a branch including controlled rectifier means and having a common branch including a load, first and second trigger circuits connected respectively to said first and second controlled rectifier means for receiving reverse current when the respective controlled rectifier means are cut off, said trigger circuits including saturable inductance for developing a high amplitude trigger without adversely effecting the frequency of operation of said inverter, means coupling said first and second trigger circuits to the energizing circuits of said second and first controlled rectifier means, respectively, whereby one controlled rectifier means cannot turn on until the other has been turned off.

3. An inverter as defined in claim 2 including means for limiting power build-up in said resonant circuits during no-load conditions.

4. An inverter as defined in claim 3 including means for supplying an auxiliary source of energy to said trigger circuits during operation of said limiting means.

5. A power supply comprising a source of voltage, a resonant circuit connected to said source and including an output circuit, resonating inductance, capacitance, and controlled rectifier means; and means for extending the load range of said supply comprising energy control means for automatically limiting the amplitude of oscillation in said circuit, said control means having magnetic means electromagnetically coupled to said inductance and connected to return excessive energy to said source, and trigger circuits coupled to said controlled rectifier means to prevent simultaneous conduction of said controlled rectifier means.

6. Apparatus according to claim 5 in which said magnetic means comprise a winding electromagnetically coupled to said inductance.

7. Apparatus according to claim 5 including means operable during operation of said energy control means for supplying auxiliary energy to said trigger circuits.

8. A power supply comprising a source of voltage, a pair of resonant circuits connected thereto each including resonating inductance, capacitance and controlled rectifier means; an output circuit coupled to said resonant circuits; and means for automatically limiting the amplitude of voltage in said resonant circuits according to the loading at said output circuit comprising electromagnetic means coupled to each of said inductances and connected to opposite sides of said source for returning excessive energy thereto.

9. Apparatus according to claim 8 in which said electromagnetic means each comprise windings coupled to the respective inductance and connected to limit the voltage across said inductance as a function of source voltage and output power.

10. A power supply comprising an output circuit; first and second controlled rectifiers connected to alternately supply current to said output circuit; a source of current for said rectifiers; first and second interlock means coupled to the respective controlled rectifiers to receive diverted cut-off current from said controlled rectifier during cut-off of same and connected to energize the other controlled rectifier; and means for preventing power build-up under minimum load conditions comprising means for automatically limiting the amplitude of voltage in the load supplying circuits of said controlled rectifiers, said limiting means including inductance coupled to each of said rectifiers and electromagnetic means associated with each of said inductances for transferring excessive energy to said source to thereby limit the voltage across each inductance for preventing said power build-up.

11. Apparatus according to claim 10 including controlled switching means connected to said output circuit to controllably shunt said rectifier supplied current from said output circuit.

12. Apparatus according to claim 10 including means for preventing operation of said interlock means during operation of said power build-up prevention means.

13. Apparatus according to claim 12 in which said means for preventing operation of said interlock means comprise saturable inductance coupled to said interlock means.

14. Apparatus according to claim 10 in which said interlock means each include a cut-off current carrying branch connected in parallel with the respective controlled rectifier.

15. Apparatus according to claim 14 in which each of said interlock means include delay means coupled to the respective branch for delaying the triggering of the other controlled rectifier until sufficient time has elapsed for the cut-off of the associated controlled rectifier.

16. Apparatus according to claim 14 including auxiliary coupling means connected between one of said branches and said source for starting operation of said power supply.

17. A power supply comprising an inverter having an output circuit, transformer means connected to said inverter, an output circuit connected to said transformer means, regulating controlled rectifier means connected to divert controlled amounts of inverter current from said output circuit, and regulating means operative whenever the output voltage departs from a selected reference potential for controlling said regulating rectifier means.

18. Apparatus according to claim 17 in which said controlled rectifier means comprise a pair of oppositely polarized controlled rectifiers.

19. Apparatus according to claim 17 in which said controlled rectifier means are operatively connected in shunt with said output circuit.

20. Apparatus according to claim 17 in which said controlled rectifier means comprise a plurality of controlled rectifiers, connected in parallel with the primary winding of said transformer means.

21. Apparatus according to claim 17 in which said regulating means include cyclical timing means synchronously connected to said inverter circuit.

22. Apparatus according to claim 17 in which said inverter includes means for maintaining a low RMS/DC ratio.

23. Apparatus according to claim 17 in which said inverter includes means for maintaining substantially continuous sinusoidal current flow therein.

24. Apparatus according to claim 17 in which said inverter includes inverting controlled rectifier means and means interlocking said rectifiers to prevent simultaneous conduction thereof.

25. Apparatus according to claim 17 in which said inverter is of the center-tapped source type and includes resonant commutating means.

26. Apparatus according to claim 25 in which said inverter includes means for preventing power build-up at low loads.

27. Apparatus according to claim 25 in which said inverter includes control means for maintaining the operating frequency of said inverter near the resonant frequency of said resonant circuits.

28. A regulated DC power supply comprising a source of direct current; an inverter connected to said source and having an output circuit and a pair of controlled rectifier means connected to alternately deliver output current to said output circuit in opposite directions; trigger means responsive to the cut-off of each controlled rectifier means for triggering on the other controlled rectifier, rectifier means connected to said output circuit, regulating controlled rectifier means connected to control current flow from said inverter output circuit to said rectifier means, and regulating means operative whenever the output voltage departs from a selected reference potential for controlling said regulating rectifier means.

29. Apparatus according to claim 28 in which said inverter includes means for automatically limiting the voltages in said inverter circuit notwithstanding changes in load.

30. Apparatus according to claim 28 in which said inverter circuit includes a resonant circuit associated with each of said inverter controlled rectifier means.

31. Apparatus according to claim 30 including saturable inductance connected to at least one of said resonant circuits for improving switch-over operation of said inverter.

32. Apparatus according to claim 28 including timing means connected to said inverters for synchronizing the energization of said regulating controlled rectifier means.

33. Apparatus according to claim 28 in which said regulating controlled rectifier means are connected to controllably divert current flow from said rectifier means.

34. Apparatus according to claim 28 in which said inverter includes control means for controlling said inverter controlled rectifier means to produce a substantially continuous sinusoidal output current.

References Cited

UNITED STATES PATENTS

| | | | |
|---|---|---|---|
| 3,119,058 | 1/1964 | Genuit | 321—18 XR |
| 3,263,152 | 7/1966 | Walker | 321—45 |
| 3,281,652 | 10/1966 | Perrins | 323—19 |
| 3,303,406 | 2/1967 | Bedford | 321—45 XR |
| 3,305,794 | 2/1967 | Seelig. | |
| 3,319,147 | 5/1967 | Mapham | 321—18 XR |
| 3,321,697 | 5/1967 | Etter | 321—45 |
| 3,330,933 | 7/1967 | Maklary | 321—11 XR |

JOHN F. COUCH, *Primary Examiner.*

WM. SHOOP, *Assistant Examiner.*

U.S. Cl. X.R.

321—45, 18